(12) United States Patent
Schachter et al.

(10) Patent No.: US 10,261,543 B2
(45) Date of Patent: Apr. 16, 2019

(54) MOBILE DEVICE CRADLE WITH IMPROVED FUNCTIONALITY (71) Applicant: Signifi Mobile Inc., Montreal (CA)

(72) Inventors: Ari Schachter, Montreal (CA); Justin Neil Goldenblatt, Hampstead (CA); Marc Seelenfreund, Raanana (IL)

(73) Assignee: Signifi Mobile Inc., Montreal (CA)

( * ) Notice: Subject to any disclaimer, the term of this patent is extended or adjusted under 35 U.S.C. 154(b) by 0 days.

(21) Appl. No.: 16/054,738

(22) Filed: Aug. 3, 2018

(65) Prior Publication Data
US 2018/0341289 A1   Nov. 29, 2018

Related U.S. Application Data (63) Continuation-in-part of application No. 15/403,254, filed on Jan. 11, 2017.

(51) Int. Cl.
H04B 1/38        (2015.01)
G06F 1/16        (2006.01)
H04B 1/3877      (2015.01)
B60R 16/02       (2006.01)
H02J 7/02        (2016.01)
H02J 7/00        (2006.01)
B60R 11/02       (2006.01)
B60R 11/04       (2006.01)
B60R 11/00       (2006.01)

(52) U.S. Cl.
CPC ......... G06F 1/1632 (2013.01); H04B 1/3877 (2013.01); B60R 11/0217 (2013.01); B60R 11/0241 (2013.01); B60R 11/0247 (2013.01); B60R 11/0252 (2013.01); B60R 11/0258 (2013.01); B60R 11/04 (2013.01); B60R 16/02 (2013.01); B60R 2011/0005 (2013.01); B60R 2011/007 (2013.01); B60R 2011/008 (2013.01); B60R 2011/0026 (2013.01); B60R 2011/0056 (2013.01); B60R 2011/0294 (2013.01); H02J 7/0044 (2013.01); H02J 7/025 (2013.01)

(58) Field of Classification Search
CPC ... H04B 1/3888; H04B 1/3877; H04W 88/02; H04W 4/80
USPC ........................................................ 455/557
See application file for complete search history.

(56) References Cited

U.S. PATENT DOCUMENTS

| | | | | |
|---|---|---|---|---|
| 9,913,388 | B1 * | 3/2018 | McHatet | H05K 5/0204 |
| 2005/0270276 | A1 * | 12/2005 | Sugimoto | G06F 3/0418 345/173 |
| 2010/0151917 | A1 * | 6/2010 | Wilson | H04B 1/3877 455/571 |
| 2012/0021808 | A1 * | 1/2012 | Tseng | G01C 21/265 455/575.1 |
| 2016/0229352 | A1 * | 8/2016 | Zhang | B60R 11/02 |
| 2017/0086314 | A1 * | 3/2017 | Simon | F16M 11/2021 |

* cited by examiner

Primary Examiner — Ajibola A Akinyemi
(74) Attorney, Agent, or Firm — Stratford Managers Corporation (57) ABSTRACT A mobile device cradle with improved functionality. Such added functionality makes the mobile device cradle useful even when not coupled with a mobile device. Cradles with improved functionality will find use in vehicles, homes, offices, and the like.

20 Claims, 10 Drawing Sheets

MOBILE DEVICE CRADLE WITH IMPROVED FUNCTIONALITY

CROSS-REFERENCE TO RELATED APPLICATIONS

This application is a continuation-in-part of pending U.S. patent application Ser. No. 15/403,254, filed Jan. 11, 2017, which is incorporated herein by reference in its entirety.

FIELD OF THE INVENTION

The present disclosure relates to cradles for mobile devices and more specifically to cradles with improved functionality.

BACKGROUND OF THE INVENTION

Mobile devices such as cell phones, personal digital assistants, digital multimedia broadcasting devices, navigation devices, smartphones, tablets, phablets, personal computers, etc. are ubiquitous in most of the developed world. Despite this, the vast majority of vehicles (e.g. cars, trucks, motorcycles, scooters, etc.) produced today do not provide means for the driver of the vehicle to conveniently store and access their mobile device, leading to distracted drivers focused more on their mobile devices than on the safe operation of their vehicles.

Cradles for mobile devices mounted onto parts of a vehicle, such as, for example, windshield, dashboard, handlebar, etc., help to address the above problem by providing the driver with a means to conveniently store and access their mobile device in a manner that does not fully take their attention off the safe operation of their vehicle. Most of the available cradles hold the mobile device in an elevated position, thereby enabling the driver of the vehicle to see the road while looking at their mobile device. However, existing cradles for mobile devices are usually simple holders with limited functionality, such as acting as a charging station for the mobile device, and they are of no use when not connected to a mobile device. Further, available cradles do not address some of the other issues associated with using a mobile device in a vehicle, such as, for example, weak cellular network signal strength or poor speaker and/or microphone quality, which result in dropped calls and a poor hands-free communication experience, respectively.

In the future, mobile devices will be more of a personal computer than a communication/entertainment device and they will be the means by which individuals connect with the digital world around them. Mobile device cradles embedded into and connected with the computer systems of homes; vehicles (semi and/or fully autonomous) and other means of transportation (e.g. hyperloop); appliances; entertainment systems; places of work; etc. will facilitate this connection to the digital world. To enable this, new mobile device cradles with improved functionality are needed.

BRIEF SUMMARY OF THE INVENTION

One aspect of the invention is a cradle for holding a mobile device. The cradle comprises a base that is to be detachably connected to a surface, an extension arm movably connected to the base for positioning the mobile device away from the base, an electronics unit (containing one or more electronic modules) movably connected to the extension arm, a wireless charger connected to the electronics unit for providing electrical power to the mobile device, and magnets attached to the wireless charger for mounting the mobile device to the cradle.

In other aspects of the invention, the cradle is detachably connected to a surface using a variety of means including, but not limited to, a partial vacuum (i.e. suction cup), adhesive-based systems, mechanical fasteners, or magnets.

In another aspect of the invention, the extension arm that connects the electronics unit to the base is rigid.

In yet another aspect of the invention, the extension arm is flexible.

In still another aspect of the invention, the extension arm is made from a number of independent members that are either rigid or flexible and that are movably connected to each other.

To enable improved functionality, in one aspect of the invention, the cradle contains one or more electronic modules such as a signal amplifier module, a wireless communication module, an audiovisual input module, a sensor module, an output module, a controller module, a memory module, a power supply module, a user input module, or an interface module.

In another aspect of the invention, the controller module contains one or more controllers.

In another aspect of the invention, the signal amplifier module contains one or more amplifiers for amplifying signals between a communications network and a mobile device.

In yet another aspect of the invention, the amplifiers amplifying the signals between a communications network and a mobile device contain one or more variable gain modules.

In still another aspect of the invention, the one or more controllers control the one or more variable gain modules.

In another aspect of the invention, the one or more amplifiers contain one or more antennas.

In other aspects of the invention, the one or more antennas are positioned within or external to the electronics unit of the cradle.

In still another aspect of the invention, the one more antennas are positioned within the wireless charger of the cradle.

In a further aspect of the invention, the induction coil of the wireless charger is used as the antenna of the signal amplifier module.

In still another aspect of the invention, the one or more antennas are positioned external to the cradle and connected to the cradle through a cable.

In another aspect of the invention, the cradle comprises at least one of a microphone, a speaker, or a camera.

In another aspect of the invention, the cradle further comprises a display for displaying visual images or signals.

In yet another aspect of the invention, the cradle further comprises a communications or electronic power supply connector such as, but not limited to, a Universal Serial Bus (USB) port.

In another aspect of the invention, the position of the extension arm can be adjusted relative to the base.

In still another aspect of the invention, the position of the electronics unit can be adjusted relative to the extension arm.

In a further aspect of the invention, the wireless charger contains members protruding therefrom to facilitate positioning of the mobile device on the wireless charger.

In another aspect of the invention, the cradle comprises an electronics unit (containing one or more electronic modules) securely attached to a surface using adhesive, mechanical, or magnetic means and a wireless charger connected to the electronics unit. The wireless charger provides electrical power to the mobile device that is detachably connected to the wireless charger by magnets.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Figure 1:
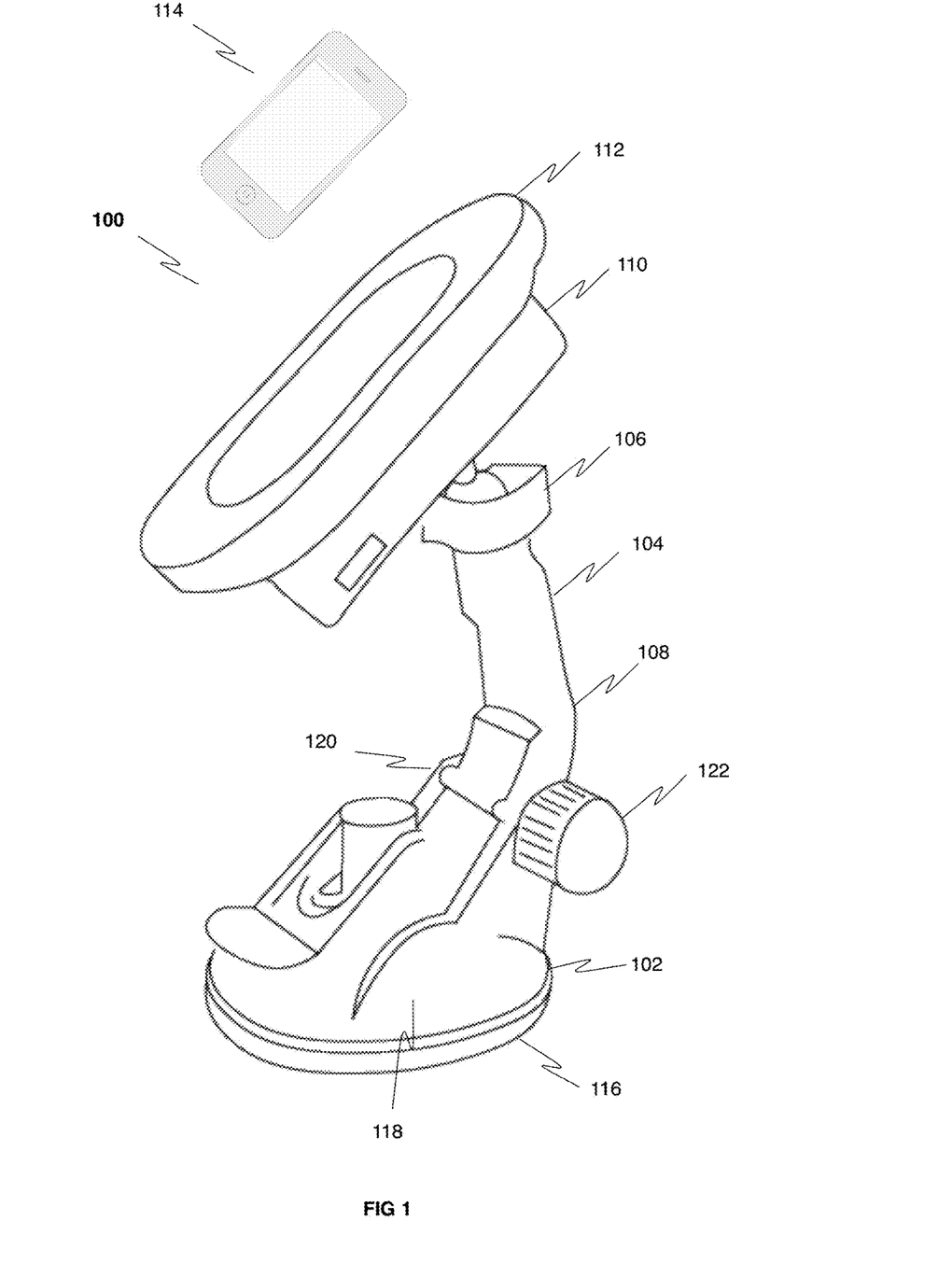
FIG. 1 is a perspective view illustrating the mobile device cradle according to an embodiment of the invention.

As shown in FIG. 1, in an embodiment the mobile device cradle 100 includes a base unit 102 configured to be detachably connected to a surface; an extension arm 104, comprising an upper end 106 and a lower end 108, rotatably connected at the lower end 108 to the base unit 102; a electronic unit 110 pivotably connected to the upper end 106 of the extension arm 104; and an attachment unit 112 securely connected to the electronic unit 110.

The base unit 102 comprises an attachment side 116 for connecting to a surface and a connector side 118, opposite the attachment side 116, for connecting to the extension arm 104. In an embodiment, the attachment side 116 uses a partial vacuum (i.e. a suction cup) for detachably connecting to a surface, such as, but not limited to, the windshield of a vehicle. In another embodiment, for surfaces in which a partial vacuum is impractical, the attachment side 116 connects to a surface using as adhesive-based system, such as double-sided adhesive tape or a fabric loop and hook fastener system with adhesive backings. In still another embodiment, the attachment side 116 is connected to a surface using mechanical fasteners such as clips, clasps, clamps, screws, nails, latches, straps, snaps, rivets, anchors and other mechanical fasteners known to those of ordinary skill in the art. In still another embodiment, the attachment side 116 connects to a surface using a magnet.

In one embodiment, the connector side 118 contains a matching pair of flanges with holes 120 that rotatably interface with the lower end 108 of the extension arm 104 through an adjustable tightening screw 122. Tightening the adjustable tightening screw 122 restricts the rotation of the extension arm 104 and fixes its position relative to the base unit 102. In another embodiment (not shown), the ball of a ball joint protrudes from the surface of the connector side 118. The lower end 108 of the extension arm 104 contains a receptacle (not shown) that has (i) a hemi-spherical depression for receiving the protruding ball of the connector side 118 and (ii) a threaded tightening nut that, when tightened, reduces the diameter of the hemi-spherical depression. When the ball of the connector side 118 engages with the hemi-spherical depression in the receptacle of the lower end 108 of the extension arm 104, the extension arm 104 is able to pivot relative to the base unit 102. When the tightening nut is tightened, the mobility of the ball within the hemi-spherical depression is significantly reduced and the position of the extension arm 104 becomes fixed relative to the base unit 102. As will be apparent to those of ordinary skill in the art, there are many alternative methods of connecting the base unit 102 to the lower end 108 of the extension arm 104 including, but not limited to, universal joints, knuckle joints, magnetic coupling joints, and the like.

In an embodiment, the extension arm 104 is a rigid member that connects the base unit 102 to the electronic unit 110. As discussed above, the extension arm 104 is rotatably connected to the base unit 102 and pivotably connected to the electronic unit 110. As such, the mobile device 114, when connected to the attachment unit 112, which is securely connected to the electronic unit 110, is able to be positioned in a number of positions relative to the base unit 102, thereby enabling convenient viewing of the mobile device 114 by the user. In another embodiment (not shown), the extension arm 104 is made from any known flexible material that can maintain its shape and, therefore, the number of positions attainable by the mobile device 114 relative to the base unit 102 are increased significantly, making viewing of the mobile device 114 by the user even more convenient. In another embodiment (not shown), the extension arm 104 comprises multiple, independent rigid or flexible members that are movably connected to each other.

Figure 2:
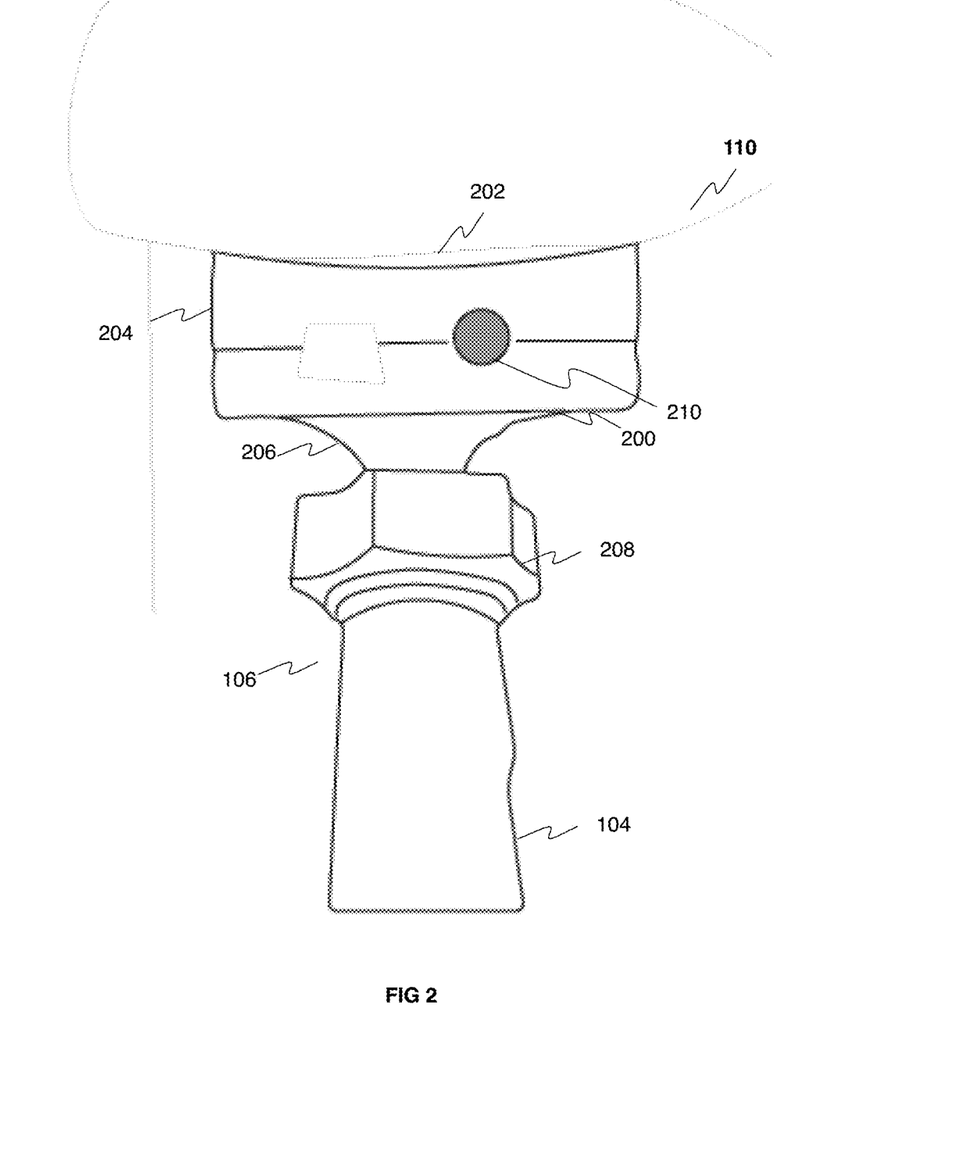
FIG. 2 is a perspective view illustrating the electronic unit and the upper end of the extension arm according to an embodiment of the invention.

As shown in FIG. 2, the electronic unit 110 contains a bottom surface 200, a top surface 202 opposite the bottom surface 200 and sidewalls 204 that connect the bottom surface 200 and the top surface 202 along their perimeters creating an enclosure that houses electronic components and/or circuitry (e.g. electrical wires, antennae, printed circuit boards, power cables, batteries, etc.) commonly found in mobile devices, computers and the like. In an embodiment a printed circuit board (not shown) is placed in such a manner that it bisects the electronic unit 110 creating two halves, an upper half whose upper surface is the top surface 202 of the electronic unit 110, and a lower half whose lower surface is the bottom surface 200 of the electronic unit. In an embodiment, the ball of a ball joint 206 protrudes from the bottom surface 200 of the electronic unit 110. The upper end 106 of the extension arm 104 contains a receptacle 208 that has (i) a hemi-spherical depression for receiving the ball of the ball joint 206 protruding from the electronic unit 110 and (ii) a threaded tightening nut that, when tightened, reduces the diameter of the hemi-spherical depression. When the ball 206 of the ball joint engages with the hemi-spherical depression in the receptacle 208 of the upper end 106 of the extension arm 104, the electronic unit 110 is able to pivot relative to the extension arm 104. When the tightening nut is tightened, the mobility of the ball within the hemi-spherical depression is significantly reduced and the position of the electronic unit 110 becomes fixed relative to the extension arm 104. As will be apparent to those of ordinary skill in the art, there are many alternative methods of connecting the electronic unit 110 to the upper end 106 of the extension arm 104 including, but not limited to, universal joints, knuckle joints, magnetic coupling joints, and the like.

In another embodiment (not shown), the mobile device cradle 100 comprises only the attachment unit 112 and the electronic unit 110. In this embodiment the mobile device cradle 100 is connected to a surface using known attachment means such as, but not limited to, the adhesive-based systems and mechanical fasteners previously described. In an embodiment, the mobile device cradle 100 is not connected to a surface and instead just sits on a surface, such as, for example, a desk. In another embodiment, the surface to which the mobile device cradle 100 is connected to is part of a receptacle embedded within, for example, but not limited to, an interior or exterior wall of a building; the dashboard or some other component of a vehicle (e.g. interior or exterior surface of a door, seat, armrest, visor, roof, floor, steering wheel, consoles, etc.); furniture (e.g. chair, table, bed, desk, etc.); apparel; accessories (e.g. watches, jewelry, etc.); appliances (e.g. fridges, dishwashers, clothes washers and/or dryers, home heating and/or cooling systems, cooking systems, etc.); entertainment systems (e.g. televisions, computer monitors, computers, projectors, stereos, etc.); and the like. In still a further embodiment, connection of the mobile device cradle 100 to the surface of the receptacle is accomplished via known communication and/or electrical power connectors such as, for example, but not limited to, a USB port or other similar type of connector.

Figure 3:
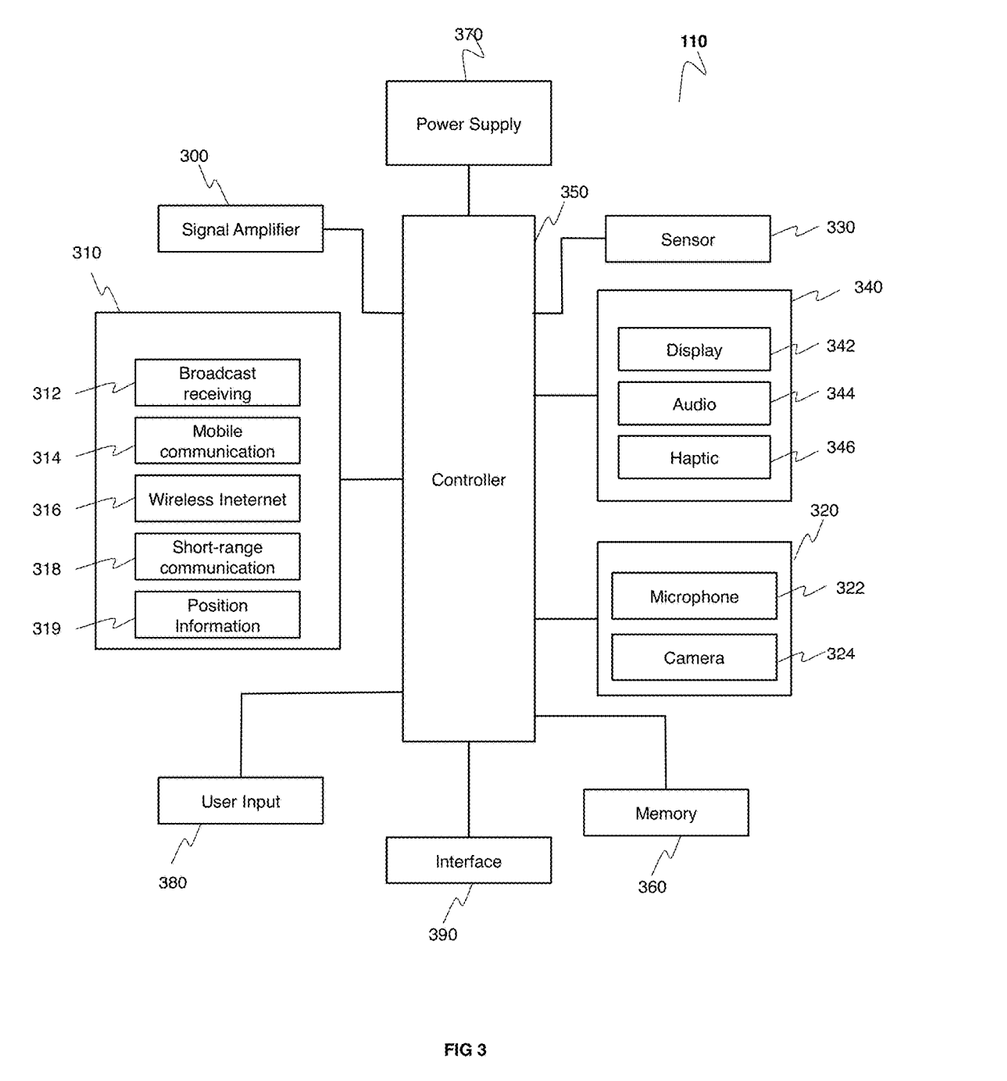
FIG. 3 is a block diagram illustrating the electronic modules of the electronic unit according to embodiments of the invention.

As shown in the block diagram of FIG. 3, in an embodiment the electronic unit 110 contains one or any number of electronic modules. Examples of electronic modules include, but are not limited to, a signal amplifier module 300, a wireless communications module 310, an audiovisual input module 320, a sensor module 330, an output module 340, a controller module 350, a memory module 360, a power supply module 370, a user input module 380, and an interface module 390.

Figure 4A:
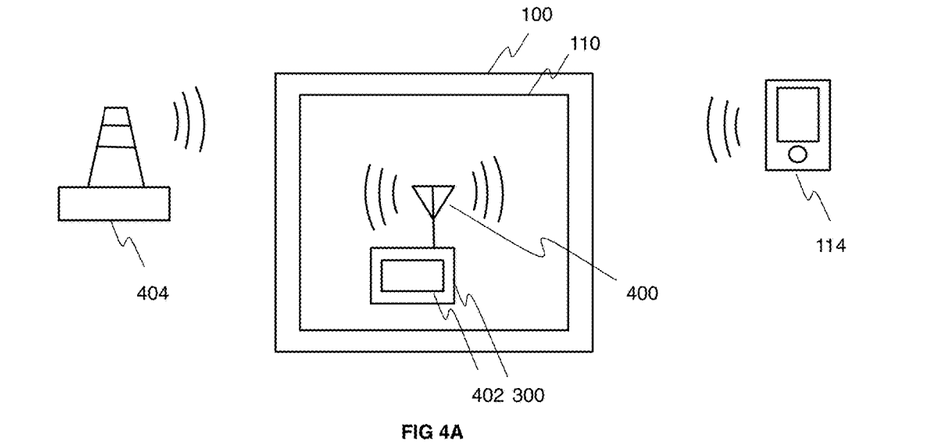
FIGS. 4A and 4B are block diagrams illustrating various exemplary embodiments and configurations of the amplifier module of the mobile device cradle of the invention.

As shown in FIG. 4A, in an embodiment the electronic unit 110 contains a signal amplifier module 300 that contains (i) an antenna 400, integrated within the electronic unit 110, for receiving and transmitting wireless signals between a cellular network base station 404 and a mobile device 114, and (ii) an amplifier 402. The amplifier 402 is connected to the antenna 400 which converts a signal received from either the cellular network base station 404 or the mobile device 114 into an electrical signal. The amplifier 402 applies an amplification factor to the electrical signal and transmits it back to the antenna 400 which converts it to a radio frequency signal and transmits it to either the mobile device 114 or the cellular network base station 404.

In an embodiment (not shown), the signal amplifier module 300 contains two antennas, one for receiving and transmitting signals from and to the cellular network base station 404 and one for receiving and transmitting signals from and to the mobile device 114. In another embodiment (not shown), signals are received from and transmitted to the mobile device 114 through a hardwired connection (e.g. a cable) rather than through the first or second antenna.

Figure 4B:
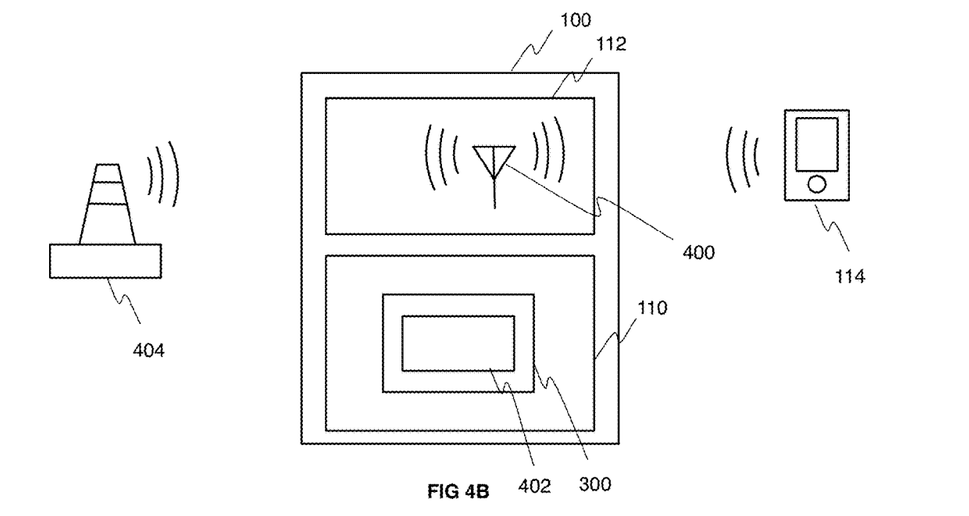

As shown in FIG. 4B, in an alternative embodiment the antenna 400 is external to the electronic unit 110 but integrated within other components of the mobile device cradle 100 such as, for example, the attachment unit 112. In another embodiment (not shown) the antenna is integrated within the extension arm 104. In still another embodiment, the antenna is integrated within the base unit 102.

Figure 4C:
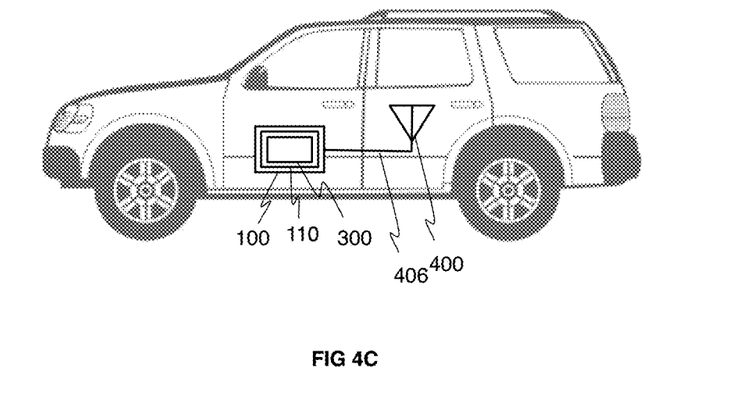
FIGS. 4C and 4D are drawings illustrating the locations of antennas according to different embodiments of the invention.

In an alternative embodiment involving the use of the mobile device cradle 100 within a vehicle, as shown in FIG. 4C, the first antenna 400 is external to the mobile device cradle 100 but located within the interior of the vehicle and connected to the signal amplifier module 300 within the electronic unit 110 through a coaxial cable 406 connected to the coaxial cable port 210, as shown in FIG. 2.

Figure 4D:
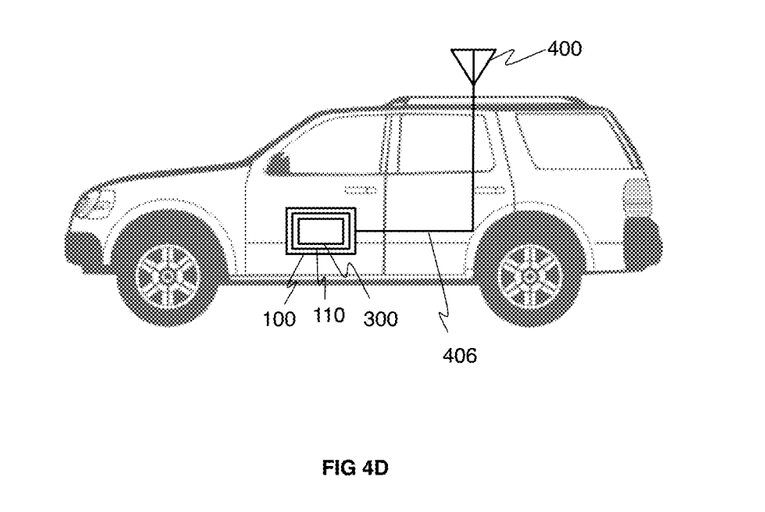

In another embodiment, as shown in FIG. 4D, the first antenna 400 is located external to the vehicle and connected to the signal amplifier module 300 within the electronic unit 110 through a coaxial cable 406 connected to the coaxial cable port 210, as shown in FIG. 2.

Figure 4E:
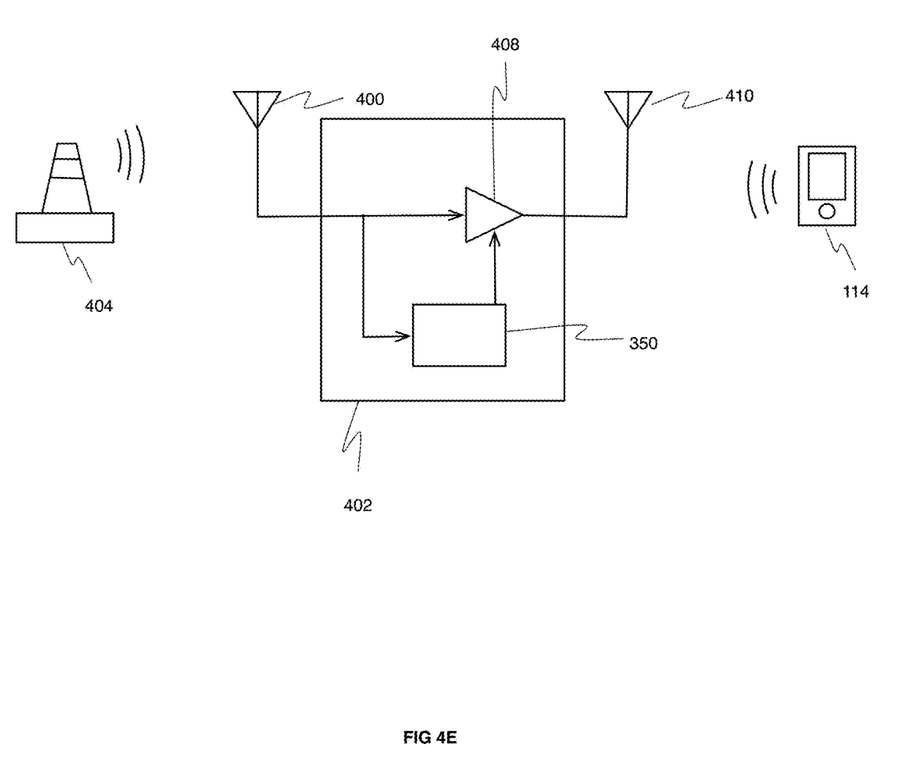
FIG. 4E is a schematic of the amplifier module according to an embodiment of the invention.

As shown in FIG. 4E, in still an alternative embodiment, the amplifier 402 is connected to a first antenna 400 which is configured to receive the signal transmitted by the base station 404. The first antenna 400 converts the received signal into an electrical signal that is sent to a variable gain module 408 which applies an amplification factor to the electrical signal. The amplified electrical signal is then transmitted, as a radio frequency signal, using a second antenna 410, to the mobile device 114. The variable gain module 408 is controlled by the controller module 350. The controller module 350 receives the electrical signal from the first antenna 400 and, based on the properties of the electrical signal, determines an optimal amplification factor to be applied to the electrical signal. In another embodiment (not shown), the variable gain module 408 receives and transmits electrical signals to a single antenna. In a further embodiment (not shown), the amplifier 402 contains one or more variable gain modules 408.

Referring back to FIG. 3, in an embodiment the wireless communication module 310 includes components that enable wireless communications between the mobile device cradle 100 and a wireless communication network. For example, the wireless communication module 310 may include a broadcast receiving unit 312, a mobile communication unit 314, a wireless internet unit 316, a short-range communication unit 318, a position information unit 319, and the like. The broadcast receiving unit 312 receives broadcast signals and/or broadcast associated information from an external broadcast management server, for example, via a broadcast channel, which can be either a satellite channel and/or a terrestrial channel. The broadcast signal may include a television broadcast signal, a radio broadcast signal, a data broadcast signal, or a combination thereof and can be transmitted to the user of the mobile device cradle 100 via the output module 340.

The mobile communication unit 314 transmits/receives mobile network signals to/from at least one of a network base station, an external terminal, a server, etc. on a mobile communication network. The mobile network signals may include audio call signals, video call signals, or other formats of data such as text/multimedia messages.

The wireless internet unit 316 supports wireless Internet access for the mobile device cradle. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication unit 318 supports short-range communications technologies such as BLUETOOTH®, Radio Frequency Identification (RFID), Infrared Data Association (IrDA), Ultra-WideBand (UWB), ZigBee, and the like.

The position information unit 319 acquires the location of the mobile device cradle 100 using real-time positioning technologies such as, but not limited to, the Global Positioning System (GPS), which receives location information from a plurality of satellites. Such location information may include coordinate information represented by latitude and longitude values.

Referring back to FIG. 3, in an embodiment involving the use of the mobile device cradle 100 in a vehicle, the audiovisual input module 320 is configured to receive audio and/or video signals such as from microphones 322 or cameras 324 or other imaging systems. The microphones 322 may be integrated within the mobile device cradle or located elsewhere within the vehicle or external to the vehicle, or any combination thereof. When integrated within the mobile device cradle 100 the microphone 322 can be located on or within any part of the mobile device cradle 100 including, but not limited to, the base unit 102, the extension arm 104, the electronics unit 110, and/or the attachment unit 112. The placement of a microphone 322 within the vehicle but external to the mobile device cradle 100 may be useful in improving the quality of the audio signals derived from the voices/sounds of the driver and/or other occupants of the vehicle. The placement of a microphone 322 external to the vehicle may be useful in helping the driver of the vehicle hear the warning sirens of emergency vehicles as the sounds of the sirens received by the microphone 322 can be converted to audio signals and broadcast to the user via the output module 340 of the electronics unit 110. Alternatively, the output module 340 could provide notification of the presence of an emergency vehicle through other means, such as visual or audio alarms or through haptic signals (i.e. vibrations).

Similarly, the cameras 324 can be integrated within the mobile device cradle 100 or located within or external to the vehicle, or any combination thereof. When integrated within the mobile device cradle 100 the cameras 324 can be located on or within any part of the mobile device cradle 100 including, but not limited to, the base unit 102, the extension arm 104, the electronics unit 110, and/or the attachment unit 112. The placement of a camera 324 within the vehicle but external to the mobile device cradle 100 may be useful in generating improved images of the driver and/or other occupants of the vehicle. Whether integrated within the mobile device cradle 100 or placed elsewhere inside the vehicle, the camera 324 can be positioned to capture images from within the vehicle or external to the vehicle. When positioned to capture images external to the vehicle (or when placed on the exterior of the vehicle), the camera 324, together with image recognition and analysis software embedded within the audiovisual input module 320, or elsewhere within the electronics unit 110, can be utilized as a part of a collision avoidance system. When the software detects an obstruction or potential collision, it directs the output module 340 of the electronics unit 110 to warn the driver of the vehicle through a visual, audio, or haptic alarm. As will be apparent to one skilled in the art, various types of cameras can be used including, but not limited to, digital cameras, infrared night vision cameras, thermal energy cameras, and the like. The camera 324 can process image frames such as still images or moving images and these frames can be displayed on a display unit 342. The image frames processed by the camera(s) 324 may be stored in the memory module 360 or transmitted to the outside via the wireless communication module 310. Likewise, the microphone(s) 322 can process received sounds into audio data and store this data in the memory module 360 and/or transmit the audio data via the wireless communication module 310.

In an embodiment, the sensor module 330 contains sensors that can detect a movement and/or a significant acceleration or deceleration of the mobile device cradle 100. The sensors may be integrated within the mobile device cradle 100 or located elsewhere within the vehicle or external to the vehicle, or any combination thereof. When integrated within the mobile device cradle 100 the sensors can be located on or within any part of the mobile device cradle 100 including, but not limited to, the base unit 102, the extension arm 104, the electronics unit 110, and/or the attachment unit 112. Upon detecting a movement (while in parking mode) or a significant acceleration or deceleration (while in driving mode), the sensor module 330 generates commands or signals for controlling the operation of microphones 322 and/or cameras 324 and for either storing the processed audio and visual data in the memory module 360 or transmitting the processed data via the wireless communication module 310. This real-time collection, storage, and/or transmission of visual and audio data can be useful in cases involving vandalism or accidents. As will be apparent to one skilled in the art, other types of sensors can be included within the sensor module 330. These include, but are not limited to, infrared sensors, radar scanners/sensors, lidar scanners/sensors, temperature sensors, gas sensors, smoke sensors, and the like.

The output module 340 is configured to provide outputs in a visual, audible, and/or tactile manner (i.e. audio signal, video signal, vibration signal, etc.). The output module 340 may include a display unit 342, an audio output unit 344, and a haptic unit 346. The display unit 342 may display information related to the operation of the mobile device cradle. For example, the strength of incoming/outgoing network communication signals, whether or not electrical power is being received by the mobile device cradle 100, visual alarms associated with a collision avoidance feature or the presence of an emergency vehicle, and/or processed images from the cameras 324 or memory module 360, etc. In another embodiment (not shown), the display unit 324 contains a display screen. In another embodiment (not shown), the display unit 324 contains a projector that enables the display of video images onto any surface including, but not limited to, a windshield (i.e. a heads-up-display).

The audio output unit 344 may output as sound audio data received from the wireless communication module 310, the audiovisual input module 320, or stored in the memory module 360. Further, the audio output unit 344 may emit audio alarms associated with a collision avoidance feature or the presence of an emergency vehicle. The audio output unit 344 may include a speaker and the like. The speaker may be integrated within the mobile device cradle 100 or located elsewhere within the vehicle or external to the vehicle, or any combination thereof. When integrated within the mobile device cradle 100 the speaker can be located on or within any part of the mobile device cradle 100 including, but not limited to, the base unit 102, the extension arm 104, the electronics unit 110, and/or the attachment unit 112. When placed external to the vehicle, the speaker enables the occupants of the vehicle to speak, via the audiovisual input module 320, with individuals external to the vehicle. Such a feature could be helpful when communicating with, as an example, law enforcement personnel.

The haptic unit 346 is configured to generate various tactile effects, such as a vibration, that a user of the mobile device cradle 100 can feel. Vibration generated by the haptic unit 346 may have a controllable intensity, pattern, etc., and can be used, as an example, to alert the driver to the presence of an emergency vehicle or an imminent collision.

Referring back to FIG. 3, the controller module 350 controls the overall operation of the mobile device cradle 100. For example, the controller module 350 controls the operation of the signal amplifier module 300, the audiovisual input module 320, the wireless communication module 310, and the like.

The memory module 360 may store a program for the processing and control of the controller module 350. The memory module 360 may also temporarily store input/output data using any type of suitable storage medium including flash memory, hard disk, memory card, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, etc.

The power supply module 370 supplies electrical power to the electronic unit 110 and its modules by receiving external power from the vehicle's electrical system either by direct wiring to the vehicle's battery or through one of the vehicle's 12-volt power outlet receptacles. In an embodiment (not shown), the mobile device cradle 100 has an induction coil and wireless charging capabilities and can be charged using the vehicle's wireless charger. In another embodiment, power is supplied to the mobile device cradle 100 through a communication and/or electrical power connector such as, but not limited to, a USB port.

The user input module 380 generates user input data for allowing the user to control various operations of the mobile device cradle 100 and may include, but is not limited to, a keypad, a touch pad, a touch screen, a dome switch, a jog switch, and the like.

The interface module 390 is used to receive inputs (e.g. data, information, electrical power, etc.) from an external device and transfer the received inputs to one or more modules within the electronic unit 110. Alternatively or in addition, the interface module 390 may be used to transfer data between the mobile device cradle 100 and an external device. Examples of external devices include, but are not limited to, speakers, microphones, headsets, power supply (i.e. battery charger), cameras, projectors, etc.

Figure 5:
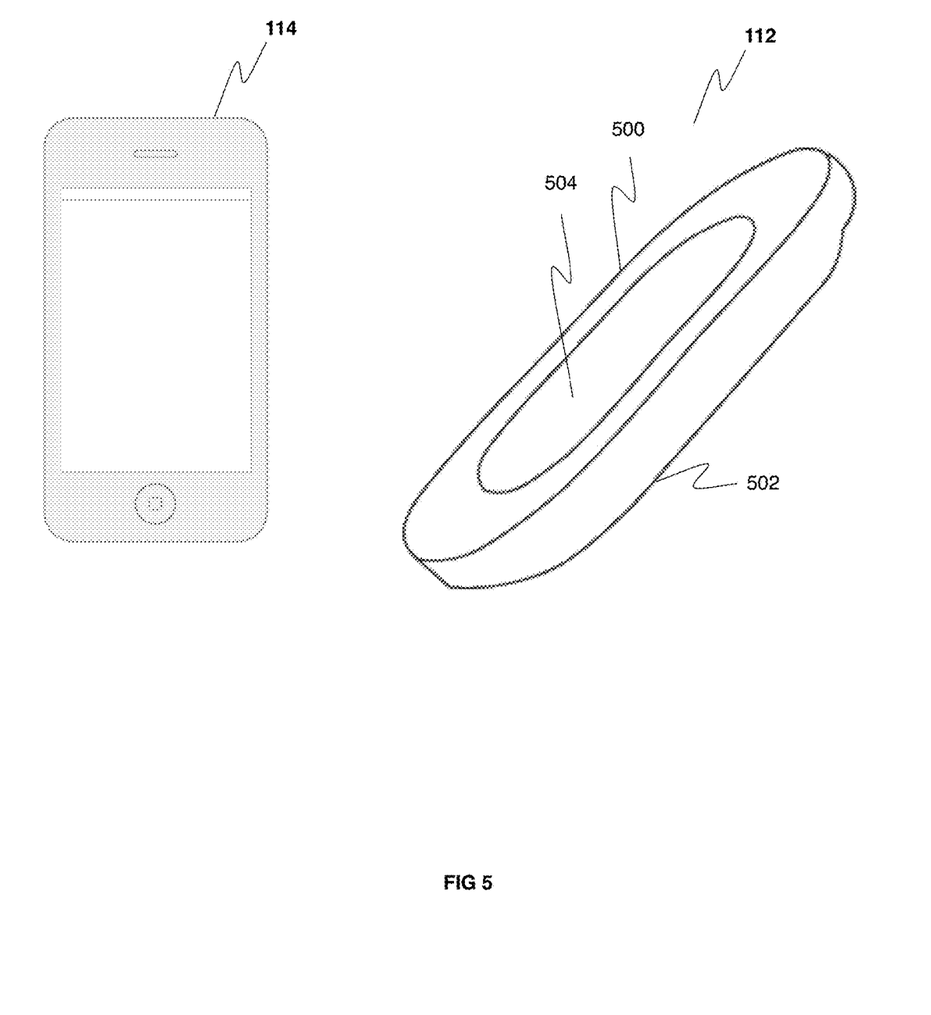
FIG. 5 is a perspective view illustrating the attachment unit according to an embodiment of the invention.

As shown in FIG. 5, in an embodiment the attachment unit 112 has a device side 500 that interfaces with the mobile device 114 and an electronic side 502, opposite the device side 500, that is connected to the electronic unit 110. In one embodiment the electronic side 502 of the attachment unit 112 serves as the top surface 202 of the electronic unit 110. Magnets 504 positioned on and, optionally, recessed into the device side 500 of the attachment unit 112 interact with a magnetic metallic piece that has been adhered to the back of the mobile device 114 (not shown) to detachably connect the mobile device 114 to the attachment unit 112. In another embodiment (not shown), where the mobile device 114 is housed in a non-metallic protective case, the magnets 504 of the attachment unit 112 interact with a magnetic metallic piece that has been adhered to the back of the protective case or inserted between the mobile device 114 and the protective case. As will be apparent to those of ordinary skill in the art, alternative methods of integrating a magnet within a non-metallic protective case exist. In another embodiment (not shown), the attachment unit 112 contains rigid or flexible protruding members, extending from the device side 500, that prevent the mobile device 114 from sliding or slipping off of the attachment unit 112. Such members can be used with or without the magnets 504 and can engage with any surface of the mobile device 114 and/or its protective case. Examples include, but are not limited to, pins or protrusions or opposing arms that act as a barriers or clamps to secure the mobile device 114 in place.

In another embodiment (not shown), the attachment unit 112 contains a wireless charger for wirelessly charging or powering a mobile device 114 detachably connected to the attachment unit 112. The wireless charger transfers electrical energy between the attachment unit 112 and the mobile device 114 using the principle of electromagnetic induction. Each device contains an induction coil and when one of these coils is supplied with an electrical current, and the other coil is brought into close proximity, an electromagnetic field is created. The coil not supplied with electrical current uses the electromagnetic field to create an electrical current which can then be used to charge that device's batteries or to power the device. Industry standards for wireless charging are currently being developed by groups such as, the Alliance for Wireless Power (A4WP), the Power Matters Alliance (PMA), the Wireless Power Consortium (Qi), and/or the AirFuel Alliance. In an embodiment, the inductive coil of the wireless charger contained within the attachment unit 112 can be utilized as an antenna for use with the signal amplifier module 300. In a further embodiment, the attachment unit 112 is movably connected to the electronic unit 110 using known means, such as, but not limited to ball-joints, pivots, and the like.

In an embodiment the magnets 504 used to secure the mobile device 114 to the attachment unit 112 are rare earth magnets such as, but not limited to, sintered Neodymium-Iron-Boron (NdFeB) magnets. Neodymium-based magnets are the strongest type of permanent magnets commercially available. They have replaced other types of magnets in many applications in modern products that require strong permanent magnets, such as motors in cordless tools, hard disk drives and magnetic fasteners. However, the stronger magnetic fields associated with NdFeB magnets can interfere with mechanical and/or electronic systems. This is particularly the case for products that require large NdFeB magnets because the strength of the magnetic field increases with the size of the magnet and so the potential for interference also increases with magnet size.

Mobile devices are relatively large and heavy. For example, the Apple iPhone 6S is 138 mm long and 67 mm wide and weighs 143 grams. The Samsung Galaxy S9+ is even bigger and heavier at 158 mm in length, 73 mm in width and weighing 189 grams. Securing such large and heavy mobile devices to a mobile device cradle using, primarily, magnetic means, such as described in the present invention, requires a strong magnetic field that will prevent slippage or detachment of the mobile device from the cradle during operation of the vehicle; as such operation will introduce vibrations, jostling, and shaking of the mobile device/cradle. However, a strong magnetic field, while necessary for preventing slippage or detachment of the mobile device from the cradle, may interfere with other components of the cradle, such as electronic systems (e.g. signal amplifiers, antennae, etc.). This may be why prior art mobile device cradles that incorporate signal amplifiers, antennae and the like, avoid using magnets to secure the mobile device to the cradle (see US2009/0131131). Instead, they use mechanical fixtures such as clamps, despite the fact that such mechanical fixtures introduce complexities into the engineering, manufacturing, and operation of the cradle.

In fact, our experience shows that it is not obvious to utilize magnets to secure a mobile device to a cradle that comprises an electronic system (i.e. signal amplifier with internal antenna) as the presence of the magnet has a surprising and deleterious effect on the performance of the amplifier; even nullifying its ability to amplify the signal between the network base station and the mobile device. Unexpectedly, it was discovered that the positioning of the antenna within the electronic unit had a major impact on the ability of the amplifier to function satisfactorily. Changing the position of the antenna within the electronic unit had unexpected effects on amplifier performance.

Figure 6A:
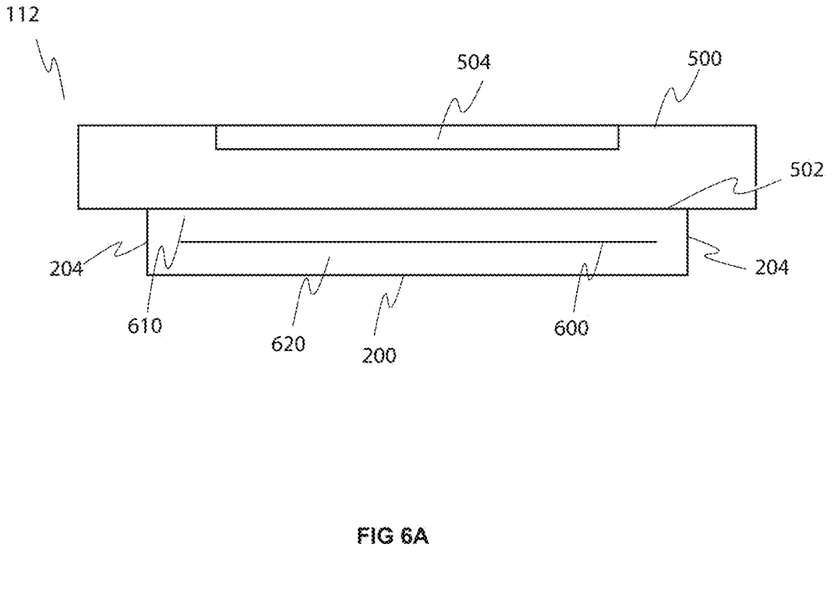
FIG. 6A is a cross-section of a preferred embodiment of the attachment unit and the electronic unit.

The following describes an embodiment of the upper part of the mobile device cradle (i.e. electronic unit 110 and attachment unit 112) in which the testing of the effect of antenna positioning on amplifier performance was conducted. Referring now to FIG. 6A, the magnet 504 was a sintered NdFeB rare earth magnet measuring 35 mm in diameter and 3 mm in thickness. The magnet was recessed into the device side 500 of the attachment unit 112 and held in place using a central threaded bolt/nut that passed through the attachment unit 112. The electronic side 502 of the attachment unit 112 served as the top surface 202 of the electronic unit 110. The electronic unit 110 (which measured 130 mm×64 mm) contained, among other things, a printed circuit board 600 that bisected the electronic unit 110, creating (i) an upper half 610 enclosed by the printed circuit board 600 at the bottom, the electronic side 502 of the attachment unit 112 at the top, and the sidewalls 204, and (ii) a lower half 620 enclosed by the bottom surface 200 of the electronic unit 110 at the bottom, the printed circuit board 600 at the top, and the sidewalls 204.

Figure 6B:
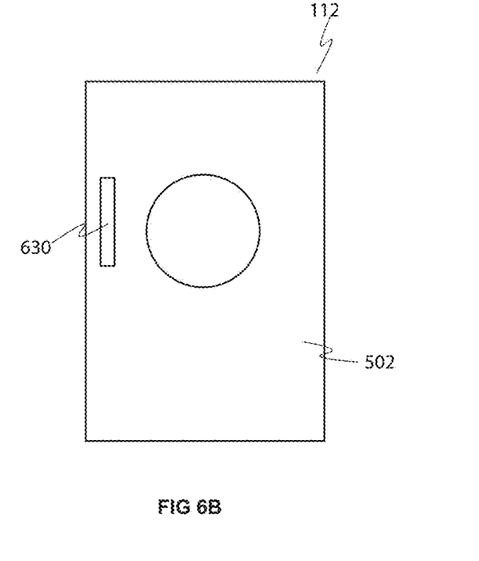
FIGS. 6B, 6C, and 6D are drawings outlining various antenna positions within the electronic unit.

Referring now to FIG. 6A and FIG. 6B, in an embodiment the antenna 630 was attached to the electronic side 502 of the attachment unit 112 adjacent to one of the sides that measured 130 mm in length. This placement, after assembly, positioned the antenna 630 within the upper half 610 of the electronic unit 110, between the electronic side 502 of the attachment unit 112 and the printed circuit board 600. The straight-line distance between the antenna 630 and the nearest edge of the magnet 504 in this configuration was 5 mm. The distance between the antenna 630 and the center of the magnet 504 was 22.5 mm. Unexpectedly, in this configuration the amplifier was not able to amplify the signal between the network base station and the mobile device.

Figure 6C:
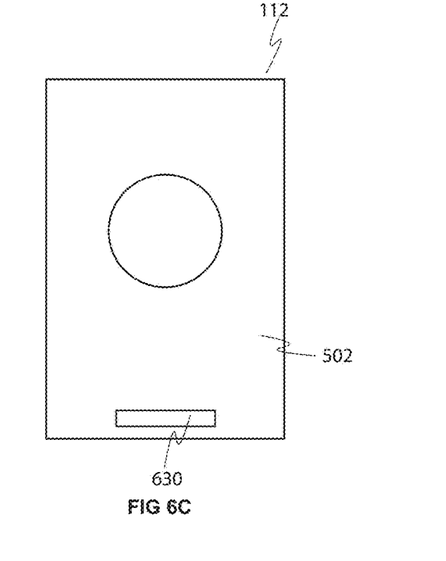

Referring now to FIG. 6A and FIG. 6C, in an embodiment the electronic unit 110 was lengthened to 148 mm from 130 mm (while still maintaining its width of 64 mm) and the antenna 630 was attached to the electronic side 502 of the attachment unit 112 adjacent to one of the sides that measured 64 mm in length. This placement, after assembly, positioned the antenna 630 within the upper half 610 of the electronic unit 110, between the electronic side 502 of the attachment unit 112 and the printed circuit board 600. The straight-line distance between the antenna 630 and the nearest edge of the magnet 504 in this configuration was 30 mm. The distance between the antenna 630 and the center of the magnet 504 was 47.5 mm. Unexpectedly, in this configuration the amplifier was not able to amplify the signal between the network base station and the mobile device to a sufficient degree, although its performance was improved over the previous configuration.

Figure 6D:
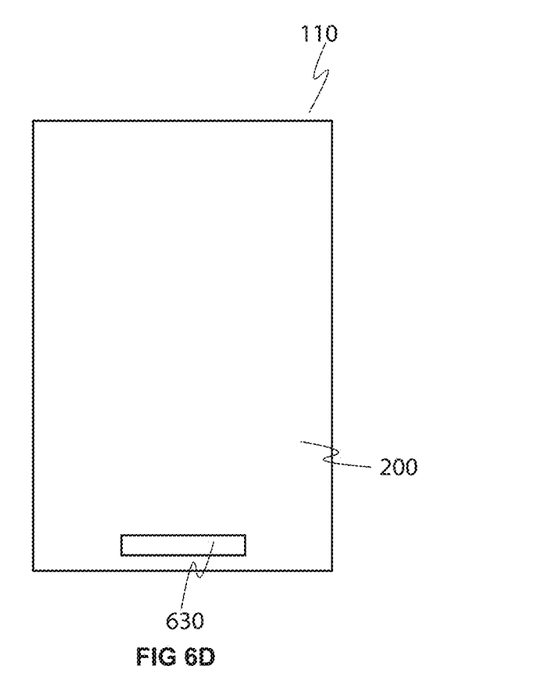

Referring now to FIG. 6A and FIG. 6D, in another embodiment the antenna 630 was attached to the bottom surface 200 of the electronic unit 110 adjacent to one of the sides that measured 64 mm in length. This placement positioned the antenna 630 within the lower half 620 of the electronic unit 110, between the printed circuit board 600 and the bottom surface 200 of the electronic unit 110. Unexpectedly, in this configuration the amplifier was able to amplify the signal between the network base station and the mobile device.

The main difference between the positioning of the antenna 630 in the embodiment outlined in FIG. 6D compared to the embodiments outlined in FIGS. 6C and 6B is that in the FIG. 6D embodiment the antenna 630 is positioned on a different plane than the magnet 504 (i.e. there is a vertical distance or separation between the antenna 630 and the magnet 504). In the FIG. 6D embodiment the antenna 630 is positioned in the bottom halve 620 of the electronic unit 110 below the printed circuit board 600, whereas, the magnet 504 is at the top. In the other embodiments, the antenna 630 was generally positioned on the same plane as the magnet 504. It was not anticipated or obvious that positioning the antenna 630 in the same position as a non-functioning embodiment (i.e. FIG. 6C), but on a plane different from the magnet 504, would result in improved performance of the amplifier. Unexpectedly, this testing has determined that the performance of the amplifier is best when the antenna is positioned on a plane that is different from the plane in which the magnet is positioned. In an embodiment, the antenna 630 is placed in the bottom half 620 of the electronic unit 110. In another embodiment the antenna 630 is placed on the bottom surface 200 of the electronic unit 110. In a further embodiment the vertical distance or separation between the antenna 630 and the magnet 504 is greater than 10 mm. In another embodiment the vertical distance or separation between the antenna 630 and the magnet 504 is greater than 15 mm. In yet another embodiment the vertical distance or separation between the antenna 630 and the magnet 504 is greater than 20 mm.

In an embodiment, the magnet 504 is a sintered NdFeB magnet having (i) a residual induction (Br) greater than 1200 mT and more preferably between 1320-1380 mT; (ii) an intrinsic coercive force (Hci) greater than 850 kA/m and more preferably greater than or equal to 955 kA/m; and (iii) a maximum energy product ((BH)max) greater than 300 KJ/m3 and more preferably between 342-366 KJ/m3.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A cradle for holding a mobile device, comprising: a base, said base configured to be detachably connected to a surface; an extension arm movably connected to said base, said extension arm for positioning said mobile device distant from said base; an electronics unit movably connected to said extension arm, said electronics unit housing a printed circuit board and including one or more electronic modules, said one or more electronic modules including a signal amplifier, a controller configured to automatically adjust a gain of said signal amplifier based on signals from a communications network, and at least one antenna for transmitting signals between said signal amplifier and said mobile device; and an attachment unit connected to said electronics unit, said attachment unit housing a rare earth magnet having a maximum energy product (BHmax) between 300 KJ/m$^3$ and 366 KJ/m$^3$, an intrinsic coercive force (Hci) between 860 kA/m and 955 kA/m, and a residual induction (Br) between 1200 mT and 1380 mT for detachably securing said mobile device to said cradle; wherein said rare earth magnet, said printed circuit board, and said antenna are positioned on three different planes that are not coplanar; and wherein said printed circuit board is positioned between said rare earth magnet and said antenna.

2. The cradle of claim 1, wherein said base uses one or more partial vacuums to detachably connect to said surface.

3. The cradle of claim 1, wherein said extension arm is rigid.

4. The cradle of claim 1, wherein said extension arm includes multiple, independent members movably connected to each other.

5. The cradle of claim 4, wherein said independent members are rigid or flexible.

6. The cradle of claim 1, further comprising a second antenna for transmitting signals between a communication network base station and said cradle, wherein said second antenna is connected to said cradle by a cable.

7. The cradle of claim 1, further comprising a communications or electronic power supply connector.

8. The cradle of claim 7, wherein said communications or electronic power supply connector is a UBS port.

9. The cradle of claim 1, further comprising a coaxial cable port.

10. The cradle of claim 1, further comprising at least one of a wireless communication module, an audiovisual input module, a sensor module, an output module, a memory module, a power supply module, a user input module, or an interface module.

11. The cradle of claim 1 wherein said attachment unit houses members protruding therefrom to facilitate positioning of said mobile device on said attachment unit.

12. The cradle of claim 1, wherein said attachment unit houses a wireless charger for providing electrical power to said mobile device.

13. A cradle for holding a mobile device, comprising: an electronics unit housing a printed circuit board and including one or more electronic modules, said one or more electronic modules including a signal amplifier, a controller configured to automatically adjust a gain of said signal amplifier based on signals from a communications network, and at least one antenna for transmitting signals between said signal amplifier and said mobile device; and an attachment unit connected to said electronics unit, said attachment unit housing a rare earth magnet having a maximum energy product (BHmax) between 300 KJ/m$^3$ and 366 KJ/m$^3$, an intrinsic coercive force (Hci) between 860 kA/m and 955 kA/m, and a residual induction (Br) between 1200 mT and 1380 mT for detachably securing said mobile device to said cradle; wherein said rare earth magnet, said printed circuit board, and said antenna are positioned on three different planes that are not coplanar; and wherein said printed circuit board is positioned between said rare earth magnet and said antenna.

14. The cradle of claim 13, further comprising a second antenna for transmitting signals between a communication network base station and said cradle, wherein said second antenna is connected to said cradle by a cable.

15. The cradle of claim 13, further comprising a communications or electronic power supply connector.

16. The cradle of claim 15, wherein said communications or electronic power supply connector is a UBS port.

17. The cradle of claim 13, further comprising a coaxial cable port.

18. The cradle of claim 13, further comprising at least one of a wireless communication module, an audiovisual input module, a sensor module, an output module, a memory module, a power supply module, a user input module, or an interface module.

19. The cradle of claim 13, wherein said attachment unit houses members protruding therefrom to facilitate positioning of said mobile device on said attachment unit.

20. The cradle of claim 13, wherein said attachment unit houses a wireless charger for providing electrical power to said mobile device.

* * * * *